United States Patent
Hart et al.

(10) Patent No.: US 11,284,278 B1
(45) Date of Patent: Mar. 22, 2022

(54) METHOD AND SYSTEM FOR TRIGGERING RECONFIGURATION OF A WIRELESS COMMUNICATION SYSTEM

(71) Applicant: Sprint Spectrum L.P., Overland Park, KS (US)

(72) Inventors: Kevin Hart, Sammamish, WA (US); Zhubo Huang, Leawood, KS (US); Nagi Mansour, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 73 days.

(21) Appl. No.: 16/854,617

(22) Filed: Apr. 21, 2020

(51) Int. Cl.
| | | |
|---|---|---|
| H04W 24/02 | (2009.01) | |
| H04W 24/10 | (2009.01) | |
| H04W 36/30 | (2009.01) | |
| H04M 7/00 | (2006.01) | |
| H04M 3/22 | (2006.01) | |
| H04W 16/18 | (2009.01) | |

(52) U.S. Cl.
CPC ......... *H04W 24/02* (2013.01); *H04M 3/2236* (2013.01); *H04M 7/006* (2013.01); *H04W 16/18* (2013.01); *H04W 24/10* (2013.01); *H04W 36/30* (2013.01)

(58) Field of Classification Search
CPC ..... H04W 24/02; H04W 24/10; H04W 16/18; H04W 36/30; H04M 7/006; H04M 3/2236
See application file for complete search history.

(56) References Cited

U.S. PATENT DOCUMENTS

| | | | |
|---|---|---|---|
| 10,608,729 B1* | 3/2020 | Youtz | H04W 24/02 |
| 2016/0165462 A1* | 6/2016 | Tan | H04W 24/02 370/254 |
| 2016/0165469 A1* | 6/2016 | Gopalakrishnan | H04W 24/08 455/67.11 |
| 2017/0168480 A1* | 6/2017 | Wanstedt | G07C 5/008 |
| 2019/0319868 A1* | 10/2019 | Svennebring | H04L 41/147 |
| 2020/0120520 A1* | 4/2020 | Ouyang | H04L 43/04 |
| 2021/0073702 A1* | 3/2021 | Yoon | H04L 43/0829 |

OTHER PUBLICATIONS

H. Almohamedh et al., "Mobile Video Quality Prediction (MVOP) for Long Term Evolution (LTE)," IAENG International Journal of Computer Science, 42:1, Feb. 17, 2015.
A. Mahdi and D. Picovici, "Advances in Voice Quality Measurement in Modern Telecommunications," Research Gate, https://www.researchgate.net/publication/222008884, Jan. 2009.

* cited by examiner

*Primary Examiner* — Habte Mered

(57) ABSTRACT

A method and system for triggering RF reconfiguration of wireless communication system. RSRP-SINR pairs determined respectively for locations in a region of interest are mapped to predicted MOS of voice communication per location, using a prediction engine trained based on actual correlated measurements of RSRP, SINR, and MOS. Locations having threshold low MOS and threshold low RSRP but not threshold low SINR are identified and clustered to identify an area where coverage strength should be increased in an effort to help improve voice-call quality. And locations having threshold low MOS and threshold low SINR but not threshold low RSRP are identified and clustered to identify an area where interference should be reduced in an effort to help improve voice-call quality. An engineering trouble ticket or other signal could then be generated to trigger associated network reconfiguration.

20 Claims, 3 Drawing Sheets

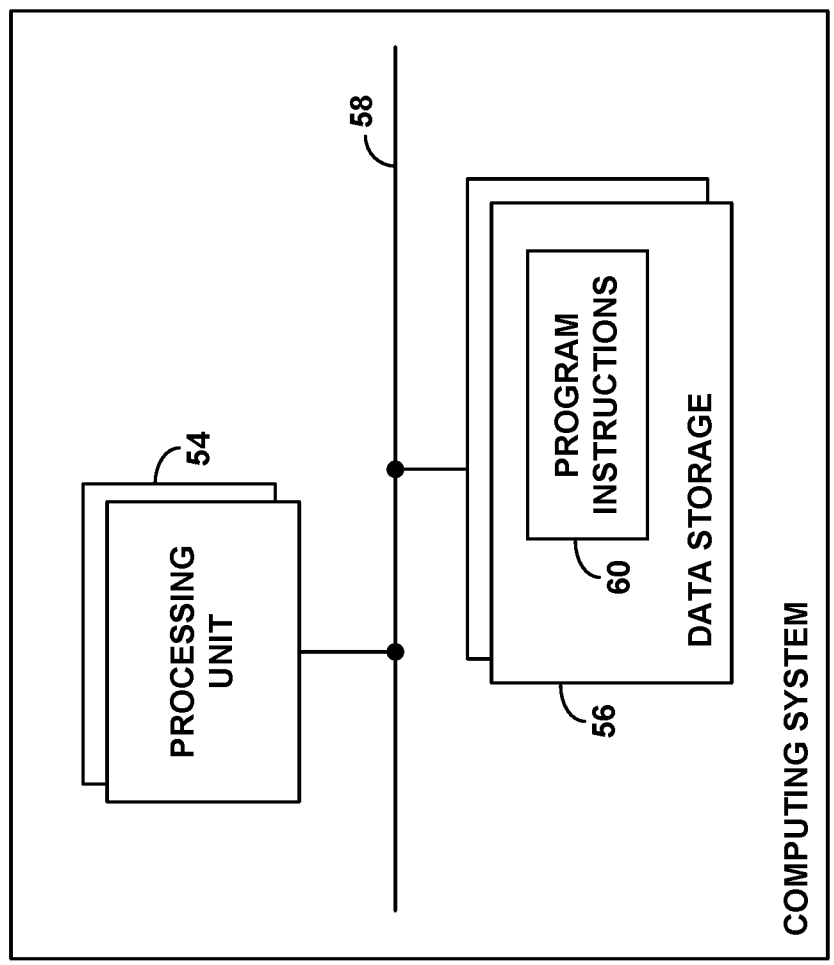

METHOD AND SYSTEM FOR TRIGGERING RECONFIGURATION OF A WIRELESS COMMUNICATION SYSTEM

BACKGROUND

A cellular wireless communication system typically includes a number of access nodes that are configured to provide cells defining wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the system could engage in air interface communication with an access node and could thereby communicate via the access node with various application servers and other entities.

Such a system could operate in accordance with one or more radio access technologies (RATs), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide one or more respective cells, each defined on respective a radio-frequency (RF) carrier, which could be frequency division duplex (FDD), with separate frequency channels for downlink and uplink communication, or time division duplex (TDD), with a single frequency channel multiplexed over time between downlink and uplink use. And on the downlink and uplink channels, the air interface of each such cell could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served UEs.

In addition, certain resources on the downlink and/or uplink of each such cell could be reserved for special purposes.

On the downlink, for instance, certain resource elements in each downlink subframe could be generally reserved to define a downlink control channel for carrying control signaling such as PRB-allocation directives and the like to served UEs, and other resource elements in each downlink subframe could be generally reserved to define an uplink shared channel in which the PRBs noted above can be allocated to carry data from the access node to UEs. Further, certain resource elements in designated downlink subframes could be reserved to carry synchronization signals that UEs could detect as an indication of the presence of coverage, and other resource elements distributed in a defined pattern throughout each downlink subframe could be reserved to carry a reference signal that UEs could measure in order to determine coverage strength.

And on the uplink, certain resource elements in each uplink subframe could be generally reserved to define an uplink control channel for carrying control signaling such as scheduling requests from UEs to the access node, and other resource elements in each uplink subframe could be generally reserved to define an uplink shared channel in which the PRBs noted above can be allocated to carry data from UEs to the access node. Further, certain resource elements on the uplink could be specially reserved to carry other uplink signals, such as random access signals, sounding reference signals, and the like.

To facilitate providing these cells, each access node of the wireless communication system could be equipped with antenna structure that is configured to transmit and receive electromagnetic signals in a region defined by an antenna pattern (or radiation pattern). The antenna pattern defines a scope of coverage in which the access node can engage in downlink transmission to UEs and receive uplink transmission from UEs. In particular, the antenna pattern could have a main lobe and could be characterized by an azimuth angle, an elevation angle, a beamwidth, and a radius. In polar coordinates, the azimuth angle defines a direction of radiation of the main lobe within a horizontal plane, as an angle of rotation around a vertical axis (in relation to North (zero degrees) for instance), the elevation angle defines a direction of radiation of the main lobe within a vertical plane, as an angle of rotation around a horizontal axis (in relation to the horizon for instance), the beamwidth defines an angular width of the main lobe within the horizontal plane, typically measured between half-power (−3 dB) points of the main lobe for instance, and the radius may define a distance of coverage from the access nod, measured along the azimuth.

OVERVIEW

When a UE enters into coverage of an example system, the UE could search for the strongest available coverage in which to connect. With the example air-interface structure noted above, for instance, the UE might scan various carriers in search of broadcast synchronization signals indicating the presence of cells. And for cell that the UE discovers, the UE could then measure energy level of the reference signal broadcast in the cell, to determine reference signal receive power (RSRP), perhaps the average power in Watts (W) or decibel-milliwatts (dBm) of resource elements that carry the reference signal. The UE could thereby identify the strongest cell that the UE discovers.

Once the UE has identified the strongest available cell, the UE could then engage in control signaling with the access node that provides the cell, to establish an air-interface connection through which the access node could then serve the UE in the cell. For instance, the UE and access node could engage in random-access signaling and then Radio Resource Control (RRC) signaling to establish an RRC connection between the access node and the UE.

Further, if the UE is not already registered for service with the core network, the UE could transmit to the access node an attach request, which the access node could forward to a core-network controller for processing. And the core-network controller and access node could then coordinate setup for the UE of one or more user-plane bearers defining virtual packet tunnels for carrying packet-data between the UE and a core-network gateway system that provides connectivity with a transport network. Each such bearer, for instance, could include an access-bearer portion that extends between the access node and the core-network gateway system and a data-radio-bearer portion that extends over the air between the access node and the UE.

Once the UE is so connected and registered, the access node could then serve the UE in a connected mode over the air-interface connection, perhaps managing downlink air-interface communication of packet data to the UE and uplink air-interface communication of packet data from the UE.

For instance, when packet data arrives at the access node for transmission to the UE, the access node could schedule use of certain downlink PRBs in subframe to carry a transport-block of that data to the UE, the access node could transmit to the UE in the control region of that subframe a scheduling directive (e.g., a Downlink Control Information (DCI) message) that specifies the PRBs that will carry the data, and the access node could transmit the data to the UE in those PRBs. And when the UE has packet-data to transmit to the access node, the UE could transmit to the access node a scheduling request including a buffer status report (BSR) indicating the quantity of data to be transmitted, the access node could schedule use of certain uplink PRBs in an upcoming subframe to carry a transport-block of that data from the UE and could transmit to the UE an advanced scheduling directive that specifies those PRBs, and the UE could then transmit the data to the access node in those PRBs.

Through this process, the UE might engage in various forms of communication, an example of which for present purposes is voice over packet (VOP) call communication. VOP-call communication involves communication of voice-call audio in a sequence of Internet Protocol (IP) packets. For an end-to-end VOP call, for instance, a device at one end of a VOP call could receive a user's voice audio (e.g., speech or other voice-band audio), digitize the voice audio to produce a digital bit stream, encode the bit stream to compress it for transmission, packetize the encoded bit stream into a sequence of packets, and transmit the packets to another device. And on receipt, the other device could then de-packetize the encoded bit stream, decode the bit stream, and convert the bit stream to analog audio output for playout to another user.

To facilitate VOP-call communication, an example wireless communication system could include an Internet Multimedia System (IMS) platform configured to host VOP calls and other such packet-based real-time media sessions. To place or receive a VOP call when served by an access node in such a system, a UE might engage in packet-based VOP-call-setup signaling (e.g., Session Initiation Protocol (SIP) signaling) with the IMS to set up the VOP call with a remote party, and the core-network controller may responsively coordinate setup for the UE of a dedicated VOP bearer to carry VOP-call packets between the UE and the core-network gateway system via the access node, to facilitate communication of those packets between the UE and the IMS. Other VOP-call arrangements are possible as well.

In addition, when a UE is served by an access node, whether or not engaged in a VOP call, the UE could continue to monitor coverage strength of the UE's serving cell as well as coverage strength of one or more other cells in the vicinity, to help ensure that the UE continues to be served by the strongest available cell. If the UE detects threshold weak coverage from the UE's serving cell and/or threshold strong (e.g., threshold stronger) coverage from another (target) cell, the UE may then engage in a handover from the serving cell to the target cell and then proceed to be served by the target cell.

Optimally, a wireless communication system like this would provide seamless, high quality wireless coverage throughout a region, to facilitate serving UEs at various locations in the region. However, coverage quality at certain locations may be undesirably poor.

Various reasons could exist for poor coverage quality. First, at a location where one or more cells provide coverage, the strongest cell coverage may still be relatively weak, perhaps due to poor antenna-pattern configuration at the access node that provides the cell. There, the RSRP may be sufficient to support connection of a UE but may be still be relatively weak. Second, at a location where one or more cells provide coverage, the strongest cell coverage may be subject to undue co-channel interference from one or more other cells, possibly due to poor antenna-pattern configuration at the access node(s) providing the other cell(s), along with any baseline RF noise. There, the signal-to-noise-plus-interference ratio (SINR) for communication in the cell (e.g., measured the power of received transmission from a serving access node divided by a sum of interference power from all other interfering signals plus the power of background or baseline noise) may be relatively low.

Unfortunately, at locations where the wireless communication system provides poor coverage quality, communication quality can also suffer. One issue in particular at such locations is the quality of VOP-call communication. Namely, when a UE engages in a VOP call at a location with relatively poor coverage quality, such as with low RSRP and/or low SINR, the voice quality as perceived by a human listener may be undesirably poor. For instance, the voice audio could be distorted or otherwise degraded.

Voice quality can be represented by a Mean Opinion Score (MOS), which could be a value ranging from 1 for unacceptable voice quality to 5 for excellent voice quality. MOS represents a listener's subjective opinion of voice quality (e.g., clarity) but can be measured or estimated algorithmically, using computational models such as Perpetual Speech Quality Measure (PSQM) or Perpetual Evaluation of Speech Quality (PESQ). In a representative wireless communication system, MOS could thus be measured at any point within the VOP-call communication path, such as at the serving access node, core-gateway system, or IMS.

Throughout a region served by a wireless communication system, measurements of RSRP and SINR per location may correlate cooperatively with MOS of VOP calls conducted by UEs at that location. Therefore, by compiling RSRP, SINR, and MOS data on a per location basis throughout a test region, a wireless service provider could thereby generate a prediction engine that correlates pairs of RSRP and SINR (RSRP-SINR pairs) with MOS, so as to facilitate predicting MOS for a location based on a determined RSRP-SINR of the location.

With such a prediction engine, at issue is then how to use the prediction engine to help efficiently trigger beneficial improvement in configuration of the wireless communication system, namely, to help improve quality of coverage at locations where MOS is likely to be threshold low.

The present disclosure addresses this issue. In accordance with the disclosure, given or having established a prediction engine that correlates RSRP-SINR pairs with MOS, a computing system could apply the prediction engine on a per location basis throughout a region, to predict per-location MOS based on determinations of per-location RSRP and SINR. Further, the computing system could identify locations throughout the region based on the identified locations each having threshold low such predicted MOS, thereby effectively establishing a MOS heat map defining locations in the region where MOS is likely to be threshold low.

Given this MOS heat map or in the process of establishing it, the computing system could further work to identify a subset of locations throughout the region where the predicted MOS is threshold low and where only one of RSRP and SINR is threshold low rather than both RSRP and SINR being threshold low.

A subset of locations where predicted MOS is threshold low and RSRP is threshold low but where SINR is not threshold low could represent locations where low RSRP, e.g., insufficient coverage, is a likely cause for the predicted low MOS. Accordingly, of the locations in such a subset, the computing system could next apply a clustering analysis to identify an area having a threshold high density of such locations, which thus represents an area where low RSRP correlates with low MOS. And for that identified area, the computing system could then output a trigger for manual or automated reconfiguration to help address predicted VOP-call quality in that area. Namely, such a trigger could be for adjusting the antenna-pattern of one or more access nodes and/or adding one or more access nodes, to add more coverage in the area so as to help increase RSRP and perhaps thereby improve VOP-call quality for UEs in the area.

On the other hand, a subset of locations where predicted MOS is threshold low and SINR is threshold low but RSRP is not threshold low could represent locations where low SINR, e.g., undue interference from one or more other cells, is the likely cause for the predicted low MOS. Accordingly, of the locations in such a subset, the computing system could next apply a clustering analysis to identify an area having a threshold high density of such locations, which thus represents an area where low SINR correlates with low MOS. And for that identified area, the computing system could then similarly output a trigger for manual or automated reconfiguration to help address predicted VOP-call quality in that area. In this case, such a trigger could be for adjusting the antenna-pattern of one or more access nodes to help reduce interference in the area, so as to help increase SINR and perhaps thereby improve VOP-call quality for UEs in the area.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 3 is a simplified block diagram of a computing system operable in accordance with the disclosure.

DETAILED DESCRIPTION

As noted above, FIG. 1 is a simplified block diagram of an example wireless communication system in which features of the present disclosure can be implemented. It should be understood, however, that variations from this and other arrangements and operations described in this disclosure are possible. For instance, various described entities, connections, functions, and other elements could be added, omitted, distributed, re-located, re-ordered, combined, or changed in other ways.

Figure 1:
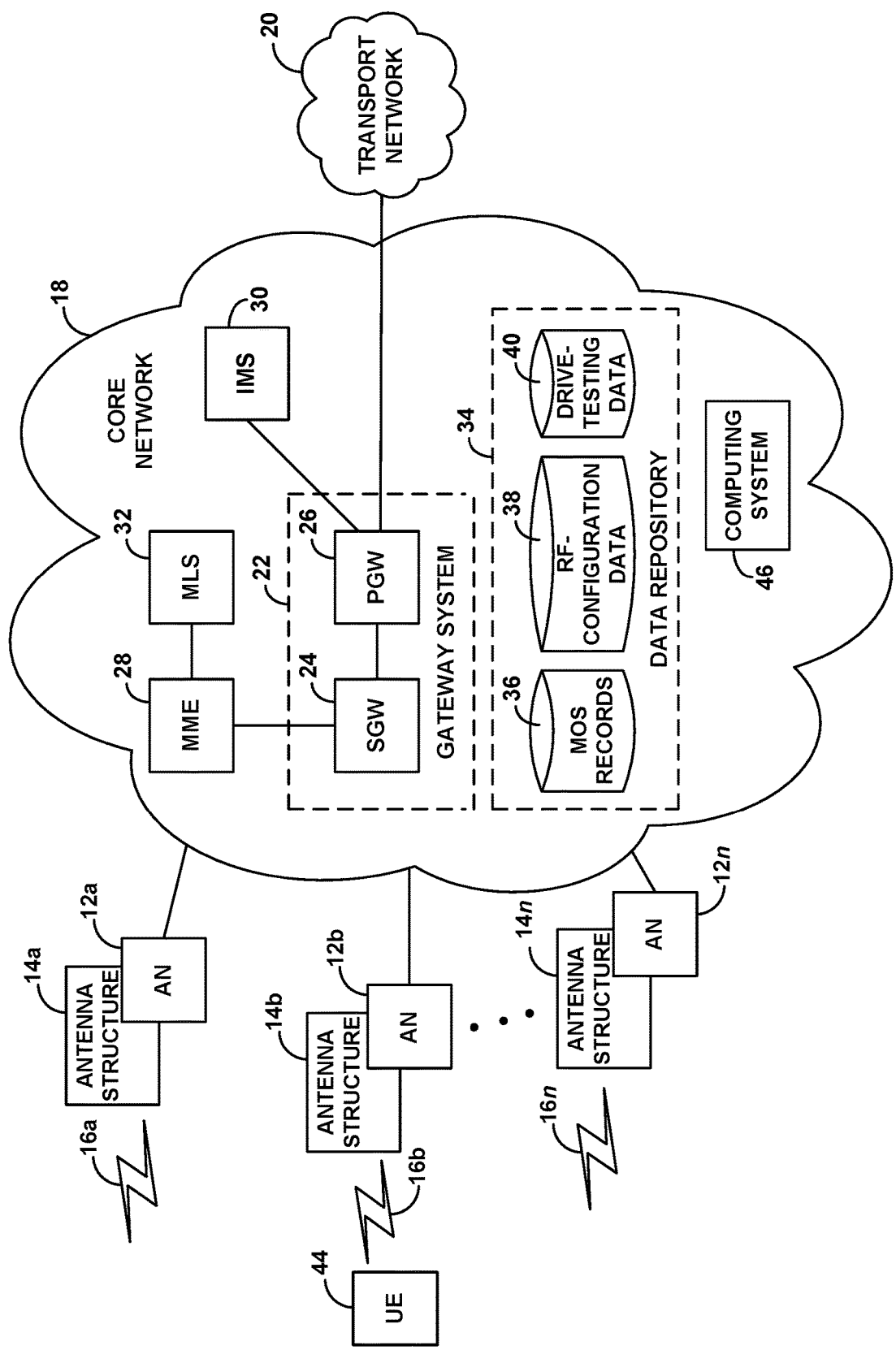
FIG. 1 is a simplified block diagram of an example network arrangement in which features of the present disclosure can be implemented.

The example wireless communication system of FIG. 1 is shown including multiple access nodes 12 (depicted as access nodes 12a, 12b, . . . 12n), each being configured with a respective antenna structure 14 (depicted as antenna structures 14a, 14b, . . . 14n) to provide a respective cell 16 (depicted as cells 16a, 16b, . . . 16n) in which to serve UEs, and with the access nodes 12 being interfaced with an example core network 18 that may provide connectivity with a transport network 20 such as the Internet. Although three example nodes are shown, the example system could include potentially many more access nodes.

These access nodes could be implemented at various respective geographic locations, such as at locations through the United States or another region. Therefore, the cells of the access nodes could provide coverage at various associated locations as well.

Each of these access nodes could be a macro access node of the type configured to provide a wide range of coverage or could take other forms, such as a small cell access node, a repeater, a femtocell access node, or the like, which might be configured to provide a smaller range of coverage, among other possibilities. Further, each access node could be configured to provide its coverage and service according to any of various RATs. For instance, a representative access node could be a 4G LTE access node (e.g., an evolved Node-B (eNB)) or a 5G NR access node (e.g., a next-generation Node-B (gNB)), among other possibilities.

In an example implementation, each cell 14 could be configured to operate on a carrier, which as noted above could be FDD or TDD. Further, the air interface of each cell could be structured as described above by way of example, to define an array of air-interface resource elements grouped into PRBs allocable by the access node as noted above, for use to carry data to or from served UEs. Though carrier-structure and/or service on could vary depending on the RAT used.

Further, the antenna structure 14 of each of one or more access nodes might take the form of an antenna array or other structure that can be configured to provide a respective antenna pattern with attributes as described above, such as azimuth, elevation, beamwidth, and radius. Azimuth, elevation, and beamwidth might be defined by physical orientation and/or other parameters, while radius might be defined by the reference-signal transmission strength from the access node, among other possibilities. These and/or other attributes may be configurable through manual engineering adjustment and/or automatically.

The core network 18 with which the example access nodes are interfaced could also take various forms, perhaps as an Evolved Packet Core (EPC) network or Next Generation Core (NGC) network, defining a packet-switched network through which entities could communicate with each other through virtual packet tunnels or the like. Further, while all of the access nodes are shown interfaced with a common core network, in an alternative implementation, various access nodes might be interfaced with different core networks or provided in other scenarios.

In the example shown, the core network 18 includes a core-network gateway system 22 including a serving gateway (SGW) 24 and a packet data network gateway (PGW) 26, through which user-plane communications could flow. Further, the core network 18 includes a core-network controller in the form of a mobility management entity (MME) 28, which could manage UE attachment and setup of user-plane bearers as noted above. In addition, the core network 18 includes an IMS 30, which supports VOP-call communication and other such services. Further, the core network 18 includes a mobile location system (MLS) 32, which functions to determine, store, and report the geographic locations of served UEs, using a location-determination technique such as observed time difference of arrival (OTDA), among other possibilities.

The representative core network is also shown including an example data repository 34, such as a database, which could store various operational data. As shown by way of example, the operational data could include MOS records 36, RF-configuration data 38, and drive-testing data 40, among other possibilities. MOS records 36 could include records of MOS determined respectively for various VOP calls served by the system. RF-configuration data 38 could be a record of the geolocation, antenna-structure configuration, and antenna pattern respectively of each of various access nodes in the system. And drive-testing data 40 could be a record of performance metrics, such as RSRP and SINR, per location and time of day, obtained by taking actual RF measurements at various locations throughout the system.

In line with the discussion above, upon entering into coverage of the access nodes as shown, a representative such UE 42 could initially scan for coverage and find the strongest available cell. The UE could then engage in random-access and RRC signaling with the access node that provides that cell, to establish an RRC connection with the access node. Further, the UE could engage in attach signaling with the MME through the UE's established RRC connection, and the MME could coordinate setup of various bearers for the UE. For a representative UE that supports VOP-call service, the MME could set up for the UE a best-efforts bearer for carrying general Internet communications and could also set up an IMS signaling bearer for carrying SIP signaling or the like between the UE and the IMS.

Establishment of each such bearer could provide network nodes in the bearer path with context information regarding the UE for which the bearer is established, and each such entity could store this information in a context record for reference. Examples of such context information could include UE identification, connection/session identification, and serving cell identification, among other examples.

Once the UE is so connected and attached, the access node could then serve the UE as described above, allocating PRBs as necessary to enable the UE to engage in packet-data communication.

As noted above, while the UE is so served, the UE might set up and engage in a VOP call. For instance, the UE might engage in SIP signaling with the IMS through the UE's IMS signaling bearer, to set up a VOP call, and the MME could responsively set up for the UE a VOP-call bearer for carrying VOP-packets of the call between the UE and the IMS. As with other bearers, this VOP-call bearer could be defined as a virtual tunnel that extends between the UE and the PGW and thus passes through the UE's serving access node, the SGW, and the PGW. With this VOP-call bearer established and with the VOP call set up, the UE could then engage in a VOP call served by the IMS, with voice audio (e.g., voice or other voice-band audio) being digitized, compressed, packetized, and conveyed along the UE's VOP-call bearer.

In a representative implementation, as UEs located throughout the system engage in such VOP calls, the MOS of each such VOP call could be measured by evaluating the VOP packets flowing through the UE's VOP-call bearer, and that MOS could be recorded as MOS records 36, in association with various context information. For instance, a programmed processing unit at the access node, at the SGW, or at the PGW could perform deep packet inspection to anonymously extract the payload from a sampling of such VOP packets and could apply a MOS algorithm such as one of those noted above to determine a MOS of the voice audio carried by those packets. Further, the processing unit could query the MLS 32 to determine the current geographic location of the UE. And the processing unit could then record the determined MOS in association with context data such as UE identifier, connection/session identifier, cell identifier, UE location, and a timestamp, among other possibilities.

FIG. 1 further illustrates in the core network 18 an example computing system 46, which could carry out various operations described herein. Computing system 46 could comprise a programmed server-class computer or could take other forms. In an example implementation, the computing system 46 has access to data in the data repository 34 to facilitate evaluation of performance metrics and carrying out operations as described. Further, the computing system could be configured to output triggers, such as messages defining engineering trouble tickets or other signals for causing reconfiguration of the RF coverage based on the described evaluation.

In line with the discussion above, the computing system could initially establish the MOS prediction engine based on evaluation of RSRP, SINR, and MOS data compiled for VOP calls conducted in a test region (e.g., in one or more test regions throughout the country for instance). In particular, drive-testing could be conducted by operating test UEs at various locations throughout the test region, at each such location having the UE engage in a VOP call, and measuring and recording in drive-testing data 40 the RSRP and SINR of the UE's coverage at that location, along with associated context data such as UE identifier, connection/session identifier, cell identifier, UE location, and a timestamp, among other possibilities. Further, the MOS associated with each such VOP call could also be measured and recorded in the MOS records 36 along with associated context data as well.

Based on the context data stored in these records, the computing system could then correlate these RSRP and SINR records with MOS records. Namely, the computing system could determine based on commonality of context data that a record of RSRP and SINR experienced by a UE at a given time and location corresponds with a record of MOS for a VOP call conducted by the UE at largely that same time and location. Through evaluation of many such correlations, the computing system could then programmatically identify trends of correlation between certain values of RSRP-SINR pairs and certain values of MOS, thereby establishing a predictable mapping between RSRP-SINR pair and MOS value. This predictable mapping could thus define the MOS prediction engine, which could receive as input a given RSRP-SINR pair and could provide as output an associated prediction of MOS.

Given such a prediction engine, the computing system could then usefully apply the prediction engine to predict levels of MOS on a per location basis throughout a region of interest, such as a given market area encompassing numerous access nodes and cells of a wireless service provider's system. The computing system could programmatically divide this region into location bins by applying a grid with a desired level of granularity over a map of the region, with each cell of the grid defining a respective location for the present analysis.

Respectively for each such location, the computing system could determine a representative RSRP-SINR pair.

The determination of RSRP and SINR per location could be done through drive-testing, taking actual measurements of RSRP and SINR at east such location. Alternatively, the determination of RSRP and SINR per location could be done by prediction using one or more RF planning tools. For instance, RF-planning tools of a type well known in the industry could make use of RF-configuration data 38 such as that noted above, to predict likely RSRP and SINR per location, based on the direction and scope of coverage of various cells in the region. The computing system could also roll up multiple such measurements or predictions per location to establish an average or other such representative value per location. The computing system could thus establish for each location both a representative measure of RSRP and a representative measure of SINR, cooperatively defining an RSRP-SINR pair for the location.

Having determined the RSRP-SINR pair per location in the region, the computing system could then apply the MOS prediction engine to predict MOS per location based on the determined RSRP-SINR pair for the location. Namely, for each location, the computing system could provide as input into the prediction engine the RSRP-SINR pair determined for the location and could receive as output from the prediction engine a prediction of MOS for the location.

In line with the discussion above, the computing system could then identify a set of locations in the region based on the MOS of each location in the identified set being threshold low. For MOS on a scale of 1 to 5 as noted above, threshold low MOS could be any MOS that is less than or equal to 3, or another threshold value designated by engineering design to be threshold low. This identified set of locations with threshold low MOS could represent a MOS heat map as noted above As further discussed above, to then help focus attention on locations where coverage strength may likely be the cause of the predicted poor VOP call communication quality, the computing system could further filter the set to be a subset of locations where the predicted MOS is threshold low and where the determined RSRP is threshold low but where the determined SINR is not threshold low. Here, for instance, the computing system could deem RSRP of a location to be threshold low if the RSRP is less than or equal to −120 dBm, or another threshold value designated by engineering design to be threshold low. And the computing system could deem SINR of a location to be threshold low if the SINR is less than or equal to −5 dB. Therefore, by way of example, the computing system could limit this subset to locations that have MOS less than or equal to 3, RSRP less than or equal to −120 dBm, and SINR greater than −5 dB.

Having identified this subset, as noted above, the computing system could then apply a clustering algorithm to identify one or more threshold dense groupings of such locations, each such dense grouping defining an area where low RSRP may be a cause for poor VOP call communication. The clustering algorithm could take various forms. By way of example, the clustering algorithm could be based on a rolling window analysis that works to identify threshold density of locations within a circle defining of a defined radius, possibly ranking multiple such areas based on their density. Other examples are possible as well, including for instance linear regression analyses to find locations that are aligned with each other.

Once the computing system has identified such an area, perhaps starting with the most dense area, the computing system could then output a trigger for network reconfiguration to help address poor coverage at the identified area. Outputting this trigger could involve generating and transmitting an engineering trouble ticket that requests addition of coverage at the identified area, in response to which engineering personnel could reconfigure and/or add access nodes to help strengthen coverage at the identified area. Alternatively or additionally, outputting this trigger could involve transmitting one or more signaling messages that cause automatic reconfiguration of one or more access nodes to help strength coverage at the identified area.

Optimally through this process, the RSRP at locations in the identified area could be strengthened, which might have the effect of improving VOP-call quality for VOP calls conducted by UEs in the area.

In addition or alternatively, as also discussed above, to help focus attention on locations where RF interference may likely be the cause of the predicted poor VOP call communication quality, the computing system could further filter the set to be a subset of locations where the predicted MOS is threshold low and where the determined SINR is threshold low but where the determined RSRP is not threshold low. Using the values noted above, for instance, the computing system could limit this subset to locations that have MOS less than or equal to 3, SINR less than or equal to −5 dB, and RSRP greater than −120 dBm.

Having identified this subset, as noted above, the computing system could then similarly apply a clustering algorithm to identify one or more threshold dense groupings of such locations, but here with each such dense grouping defining an area where low SINR may be a cause for poor VOP call communication. Here too, clustering algorithm could take any form as noted above.

Once the computing system has identified such an area, likewise possibly starting with the most dense area, the computing system could then output a trigger for network reconfiguration to help address poor coverage at the identified area. Outputting this trigger could involve generating and transmitting an engineering trouble ticket that requests adjustment of coverage of one or more cells that the RF-configuration data 38 indicates may be contributing to interference at the identified area. A goal here would be to help reduce interference at the identified area. And optimally through this process, the SINR at locations in the identified area could be strengthened, which might similarly have the effect of improving VOP-call quality for VOP calls conducted by UEs in the area.

Figure 2:
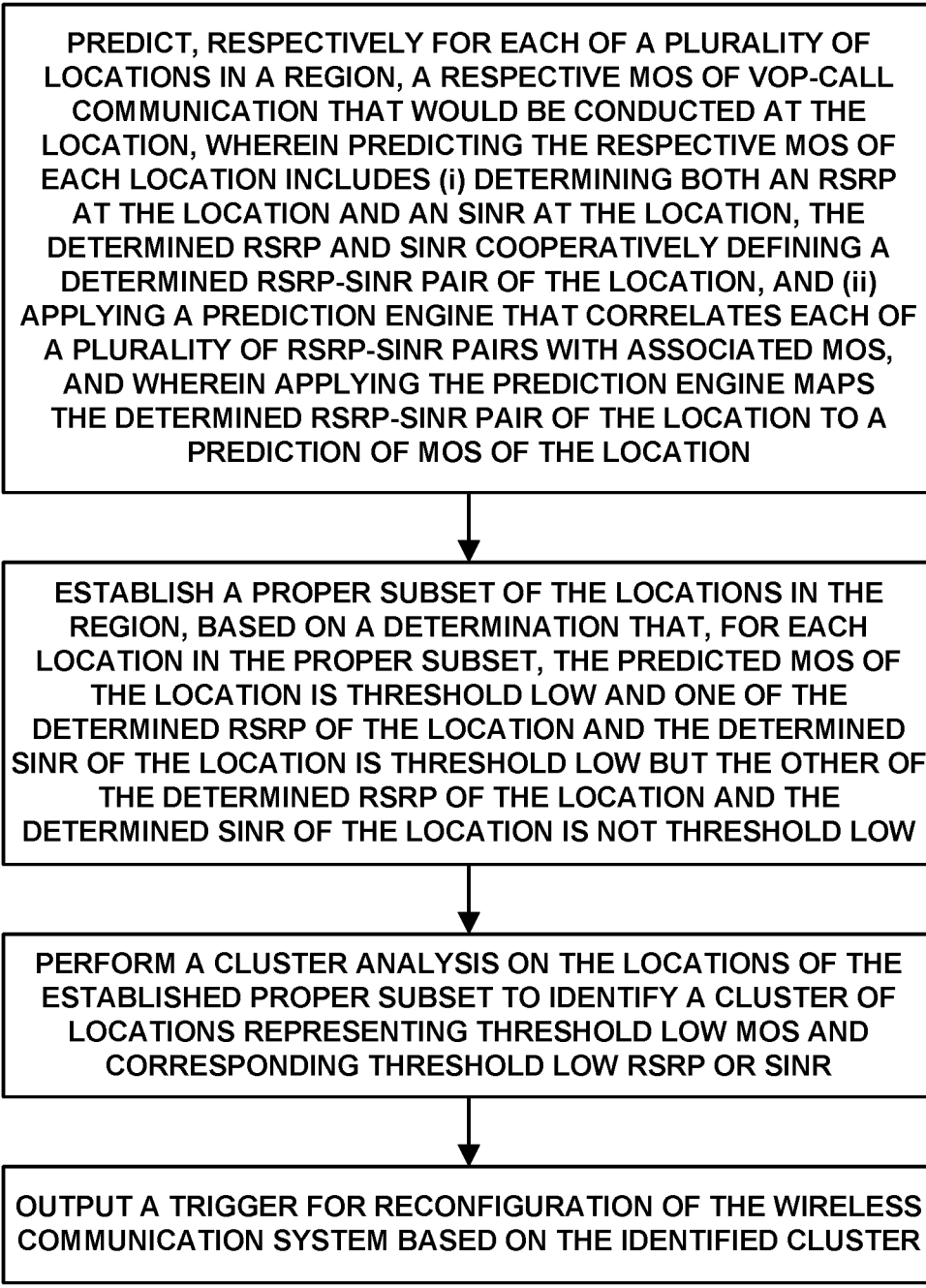
FIG. 2 is a flow chart depicting an example method in accordance with the present disclosure.

FIG. 2 is a flow chart depicting a method that could be carried out in accordance with the present disclosure, for triggering reconfiguration of a wireless communication system, where the wireless communication system includes multiple cells for serving UEs and supports voice VOP-call communication in which voice-call audio is compressed and communicated in IP packets, and where quality of VOP call communication is characterized by a MOS.

As shown in FIG. 2, at block 46, the method includes predicting, respectively for each of a plurality of locations in a region, a respective MOS of VOP-call communication that would be conducted at the location, wherein predicting the respective MOS of each location includes (i) determining both an RSRP at the location and an SINR at the location, the determined RSRP and SINR cooperatively defining a determined RSRP-SINR pair of the location, and (ii) applying a prediction engine that correlates each of a plurality of RSRP-SINR pairs with associated MOS, and wherein applying the prediction engine maps the determined RSRP-SINR pair of the location to a prediction of MOS of the location.

Further, at block 48, the method includes establishing a proper subset of the locations in the region, based on a determination that, for each location in the proper subset, the predicted MOS of the location is threshold low and one of the determined RSRP of the location and the determined SINR of the location is threshold low but the other of the determined RSRP of the location and the determined SINR of the location is not threshold low. Further, at block 50, the method includes performing a cluster analysis on the locations of the established proper subset to identify a cluster of locations representing threshold low MOS and corresponding threshold low RSRP or SINR. And at block 52, the method includes outputting a trigger for reconfiguration of the wireless communication system based on the identified cluster.

In line with the discussion above, the method could additionally include generating the prediction engine based on per-location actual measurements of RSRP, SINR, and MOS. For instance, this could include establishing a plurality of per-location correlations, including, for each of a plurality of training locations covered by the network, (i) determining an actual RSRP-SINR pair, comprising an actual RSRP at the training location and an actual SINR at the training location, (ii) determining an actual MOS for VOP-call communication conducted at the training location, and (ii) using the training location as a basis to establish, as a respective one of the per-location correlations, a correlation between the determined actual RSRP-SINR pair and the determined actual MOS. And this could then further include using the established per-location correlations as a basis to develop, as the prediction engine, a data-mapping that is useable to translate a specified RSRP-SINR pair as input into an associated prediction of MOS as output.

As further discussed above, the act of applying the prediction engine for a given location in the region could then involve using the predicted RSRP-SINR pair of the location as input to the prediction engine, with the prediction engine providing as output a prediction of MOS of the given location.

In addition, as discussed above, determining the RSRP for a given location in the region and/or determining the SINR for the given location in the region could be based on drive-testing throughout the region. Alternatively, determining the RSRP for a given location in the region and/or determining the SINR for the given location in the region could be predictive, using an RF planning tool based at least on RF configuration one or more of the cells of the wireless communication system.

As additionally discussed above, the act of establishing the proper subset of the locations in the region could be based a determination that, for each location in the proper subset, the predicted MOS of the location is threshold low, the predicted RSRP of the location is threshold low, and the predicted SINR of the location is not threshold low. And in that case, the act of performing of the cluster analysis on the locations of the established proper subset could identify a cluster of locations representing threshold low MOS and corresponding threshold low RSRP and not threshold low SINR, and the act of outputting the trigger for reconfiguration of the wireless communication system based on the identified cluster could involve outputting a trigger for adding more coverage of the wireless communication system to an area defined based at least on the identified cluster.

Alternatively, the act of establishing the proper subset of the locations in the region could be based a determination that, for each location in the proper subset, the predicted MOS of the location is threshold low, the predicted SINR of the location is threshold low, and the predicted RSRP of the location is not threshold low. And in that case, the act of performing the cluster analysis on the locations of the established proper subset could identify a cluster of locations representing threshold low MOS and corresponding threshold low SINR and not threshold low RSRP, and the act of outputting the trigger for reconfiguration of the wireless communication system based on the identified cluster could involve outputting a trigger for changing configuration of the wireless communication system so as to reduce interference at an area defined based at least on the identified cluster.

Still further, as discussed above, the act of performing the cluster analysis could involve performing linear regression to identify as the cluster a plurality of locations that are aligned with each other and/or could involve applying a rolling window analysis to identify a cluster within a circle of a predefined radius. And the act of performing the cluster analysis could result in identifying a plurality of clusters each having a respective density of locations in the proper subset, in which case the method could also involve selecting a cluster of the plurality of clusters, with the selecting being based on the selected cluster having higher density than another cluster of the plurality of clusters. Outputting the trigger for reconfiguration of the wireless communication system could then be based on the selected cluster.

FIG. 3 is next a simplified block diagram of an example computing system 46 that could carry out various features as described above. As shown in FIG. 3, the computing system includes at least one processing unit 54 and at least one non-transitory data storage 56, which could be integrated or communicatively linked together by a system bus, network, or other connection mechanism 58.

The at least one processing unit 54 could comprise one or more processors (e.g., one or more general purpose processors and/or specialized processors), such as one or more microprocessors or specialized processors. And the at least one non-transitory data storage 56 could comprise one or more volatile and/or non-volatile storage components, such as magnetic, optical, or flash storage media. An as further shown, the at least one data storage 56 could hold, store, encode, or otherwise embody program instructions 60. In a representative implementation, those program instructions 60 could be executable by the at least one processing unit 54 to carry out various features described herein.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for triggering reconfiguration of a wireless communication system, wherein the wireless communication system includes a plurality of cells for serving user equipment devices (UEs) and supports voice over packet (VOP) call communication in which voice-call audio is compressed and communicated in Internet Protocol (IP) packets, wherein quality of VOP call communication is characterized by a mean opinion score (MOS), the method comprising:

predicting, respectively for each of a plurality of locations in a region, a respective MOS of VOP-call communication that would be conducted at the location, wherein predicting the respective MOS of each location comprises (i) determining both a reference-signal receive power (RSRP) at the location and a signal-to-noise-plus-interference (SINR) at the location, the determined RSRP and SINR cooperatively defining a determined RSRP-SINR pair of the location, and (ii) applying a prediction engine that correlates each of a plurality of RSRP-SINR pairs with associated MOS, wherein applying the prediction engine maps the determined RSRP-SINR pair of the location to a prediction of MOS of the location;

establishing a proper subset of the locations in the region, based on a determination that, for each location in the proper subset, the predicted MOS of the location is threshold low and one of the determined RSRP of the location and the determined SINR of the location is threshold low but the other of the determined RSRP of the location and the determined SINR of the location is not threshold low;

performing a cluster analysis on the locations of the established proper subset to identify a cluster of locations representing threshold low MOS and corresponding threshold low RSRP or SINR; and outputting a trigger for reconfiguration of the wireless communication system based on the identified cluster.

2. The method of claim 1, further comprising generating the prediction engine based on per-location actual measurements of RSRP, SINR, and MOS.

3. The method of claim 2, wherein generating the prediction engine based on per-location actual measurements of RSRP, SINR, and MOS comprises:

establishing a plurality of per-location correlations, including, for each of a plurality of training locations covered by the network, (i) determining an actual RSRP-SINR pair, comprising an actual RSRP at the training location and an actual SINR at the training location, (ii) determining an actual MOS for VOP-call communication conducted at the training location, and (ii) using the training location as a basis to establish, as a respective one of the per-location correlations, a correlation between the determined actual RSRP-SINR pair and the determined actual MOS;

using the established per-location correlations as a basis to develop, as the prediction engine, a data-mapping useable to translate a specified RSRP-SINR pair as input into an associated prediction of MOS as output.

4. The method of claim 3, wherein applying the prediction engine for a given location in the region comprises using the predicted RSRP-SINR pair of the location as input to the prediction engine, the prediction engine providing as output a prediction of MOS of the given location.

5. The method of claim 1, wherein each of at least one of determining the RSRP for a given location in the region and determining the SINR for the given location in the region is based on drive-testing throughout the region.

6. The method of claim 1, wherein each of at least one of determining the RSRP for a given location in the region and determining the SINR for the given location in the region is a prediction made using a radio frequency (RF) planning tool based at least on RF configuration one or more of the cells of the wireless communication system.

7. The method of claim 1,
wherein establishing the proper subset of the locations in the region is based a determination that, for each location in the proper subset, the predicted MOS of the location is threshold low, the predicted RSRP of the location is threshold low, and the predicted SINR of the location is not threshold low,
wherein performing the cluster analysis on the locations of the established proper subset identifies a cluster of locations representing threshold low MOS and corresponding threshold low RSRP and not threshold low SINR, and
wherein outputting the trigger for reconfiguration of the wireless communication system based on the identified cluster comprises outputting a trigger for adding more coverage of the wireless communication system to an area defined based at least on the identified cluster.

8. The method of claim 1,
wherein establishing the proper subset of the locations in the region is based a determination that, for each location in the proper subset, the predicted MOS of the location is threshold low, the predicted SINR of the location is threshold low, and the predicted RSRP of the location is not threshold low,
wherein performing the cluster analysis on the locations of the established proper subset identifies a cluster of locations representing threshold low MOS and corresponding threshold low SINR and not threshold low RSRP, and
wherein outputting the trigger for reconfiguration of the wireless communication system based on the identified cluster comprises outputting a trigger for changing configuration of the wireless communication system so as to reduce interference at an area defined based at least on the identified cluster.

9. The method of claim 1, wherein performing the cluster analysis comprises performing linear regression to identify as the cluster a plurality of locations that are aligned with each other.

10. The method of claim 1, wherein performing the cluster analysis comprises applying a rolling window analysis to identify a cluster within a circle of a predefined radius.

11. The method of claim 1, wherein performing the cluster analysis results in identifying a plurality of clusters each having a respective density of locations in the proper subset, the method further comprising selecting a cluster of the plurality of clusters, with the selecting being based on the selected cluster having higher density than another cluster of the plurality of clusters,
wherein outputting the trigger for reconfiguration of the wireless communication system based on the selected cluster.

12. A computing system comprising:
at least one processing unit;
at least one non-transitory data storage; and
program instructions stored in the at least one data storage and executable by the at least one processing unit to carry out operations for triggering reconfiguration of a wireless communication system, wherein the wireless communication system includes a plurality of cells for serving user equipment devices (UEs) and supports voice over packet (VOP) call communication in which voice-call audio is compressed and communicated in Internet Protocol (IP) packets, wherein quality of VOP call communication is characterized by a mean opinion score (MOS), the operations including:

predicting, respectively for each of a plurality of locations in a region, a respective MOS of VOP-call communication that would be conducted at the location, wherein predicting the respective MOS of each location comprises (i) determining both a reference-signal receive power (RSRP) at the location and a signal-to-noise-plus-interference (SINR) at the location, the determined RSRP and SINR cooperatively defining a determined RSRP-SINR pair of the location, and (ii) applying a prediction engine that correlates each of a plurality of RSRP-SINR pairs with associated MOS, wherein applying the prediction engine maps the determined RSRP-SINR pair of the location to a prediction of MOS of the location, establishing a proper subset of the locations in the region, based on a determination that, for each location in the proper subset, the predicted MOS of the location is threshold low and one of the determined RSRP of the location and the determined SINR of the location is threshold low but the other of the determined RSRP of the location and the determined SINR of the location is not threshold low, performing a cluster analysis on the locations of the established proper subset to identify a cluster of locations representing threshold low MOS and corresponding threshold low RSRP or SINR, and outputting a trigger for reconfiguration of the wireless communication system based on the identified cluster.

13. The computing system of claim 12, wherein the operations further include generating the prediction engine based on per-location actual measurements of RSRP, SINR, and MOS, wherein generating the prediction engine based on per-location actual measurements of RSRP, SINR, and MOS comprises:

establishing a plurality of per-location correlations, including, for each of a plurality of training locations covered by the network, (i) determining an actual RSRP-SINR pair, comprising an actual RSRP at the training location and an actual SINR at the training location, (ii) determining an actual MOS for VOP-call communication conducted at the training location, and (ii) using the training location as a basis to establish, as a respective one of the per-location correlations, a correlation between the determined actual RSRP-SINR pair and the determined actual MOS;

using the established per-location correlations as a basis to develop, as the prediction engine, a data-mapping useable to translate a specified RSRP-SINR pair as input into an associated prediction of MOS as output.

14. The computing system of claim 13, wherein applying the prediction engine for a given location in the region comprises using the predicted RSRP-SINR pair of the location as input to the prediction engine, the prediction engine providing as output a prediction of MOS of the given location.

15. The computing system of claim 12, wherein each of at least one of determining the RSRP for a given location in the region and determining the SINR for the given location in the region is a prediction made using a radio frequency (RF) mapping algorithm based at least on RF configuration one or more of the cells of the wireless communication system.

16. The computing system of claim 12, wherein establishing the proper subset of the locations in the region is based a determination that, for each location in the proper subset, the predicted MOS of the location is threshold low, the predicted RSRP of the location is threshold low, and the predicted SINR of the location is not threshold low, wherein performing the cluster analysis on the locations of the established proper subset identifies a cluster of locations representing threshold low MOS and corresponding threshold low RSRP and not threshold low SINR, and wherein outputting the trigger for reconfiguration of the wireless communication system based on the identified cluster comprises outputting a trigger for adding more coverage of the wireless communication system to an area defined based at least on the identified cluster.

17. The computing system of claim 12, wherein establishing the proper subset of the locations in the region is based a determination that, for each location in the proper subset, the predicted MOS of the location is threshold low, the predicted SINR of the location is threshold low, and the predicted RSRP of the location is not threshold low, wherein performing the cluster analysis on the locations of the established proper subset identifies a cluster of locations representing threshold low MOS and corresponding threshold low SINR and not threshold low RSRP, and wherein outputting the trigger for reconfiguration of the wireless communication system based on the identified cluster comprises outputting a trigger for changing configuration of the wireless communication system so as to reduce interference at an area defined based at least on the identified cluster.

18. The computing system of claim 12, wherein performing the cluster analysis results in identifying a plurality of clusters each having a respective density of locations in the proper subset, the method further comprising selecting a cluster of the plurality of clusters, with the selecting being based on the selected cluster having higher density than another cluster of the plurality of clusters, wherein outputting the trigger for reconfiguration of the wireless communication system based on the selected cluster.

19. A non-transitory computer readable medium having stored thereon program instructions executable by at least one processing unit to carry out operations for triggering reconfiguration of a wireless communication system, wherein the wireless communication system includes a plurality of cells for serving user equipment devices (UEs) and supports voice over packet (VOP) call communication in which voice-call audio is compressed and communicated in Internet Protocol (IP) packets, wherein quality of VOP call communication is characterized by a mean opinion score (MOS), the operations including:

predicting, respectively for each of a plurality of locations in a region, a respective MOS of VOP-call communication that would be conducted at the location, wherein predicting the respective MOS of each location comprises (i) predicting both a reference-signal receive power (RSRP) at the location and a signal-to-noiseplus-interference (SINR) at the location, the predicted RSRP and SINR cooperatively defining a predicted RSRP-SINR pair of the location, and (ii) applying a prediction engine that correlates each of a plurality of RSRP-SINR pairs with associated MOS, wherein applying the prediction engine maps the predicted RSRP-SINR pair of the location to a prediction of MOS of the location, establishing a proper subset of the locations in the region, based on a determination that, for each location in the proper subset, the predicted MOS of the location is threshold low and one of the determined RSRP of the location and the determined SINR of the location is threshold low but the other of the determined RSRP of the location and the determined SINR of the location is not threshold low, performing a cluster analysis on the locations of the established proper subset to identify a cluster of locations representing threshold low MOS and corresponding threshold low RSRP or SINR, and outputting a trigger for reconfiguration of the wireless communication system based on the identified cluster.

20. The non-transitory computer-readable medium of claim 19, wherein the operations further include generating the prediction engine based on per-location actual measurements of RSRP, SINR, and MOS.

* * * * *